Dec. 31, 1940.   W. R. APPLEMAN   2,226,700
ELECTRIC MOTOR
Filed Oct. 31, 1938
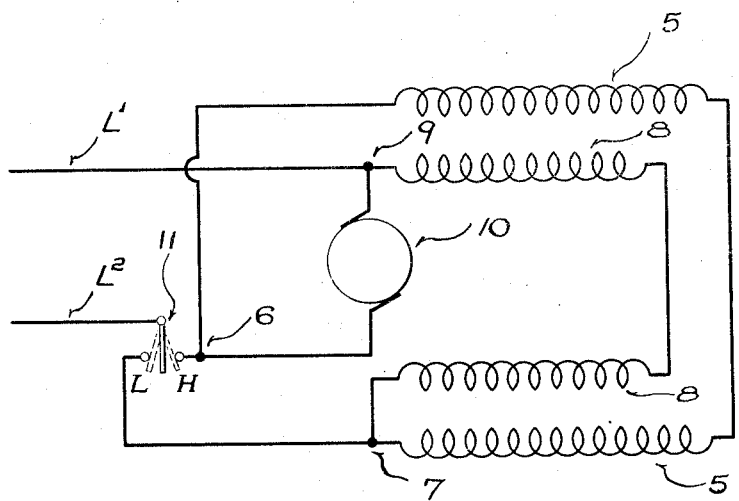
Inventor
Wilbur R. Appleman Patented Dec. 31, 1940

2,226,700

UNITED STATES PATENT OFFICE 2,226,700

ELECTRIC MOTOR

Wilbur R. Appleman, Wausau, Wis., assignor to Marathon Electric Manufacturing Corporation, Wausau, Wis., a corporation of Wisconsin Application October 31, 1938, Serial No. 237,867

10 Claims. (Cl. 172—179)

This invention relates to electric motors, and refers particularly to two speed direct current motors.

In the past, the attainment of two speed operation in direct current motors entailed the introduction of extraneous resistance into the armature circuit. This was done either through the use of a variable resistance connected in series with the armature circuit, or through a fixed resistance connected into the armature circuit for low speed operation through proper actuation of a switch. Such introduction of extraneous resistance is objectionable as it increases the cost of the motor and introduces an added source of trouble.

It is therefore an object of this invention to provide an electric motor of the character described so constructed that two speed operation is obtained without the use of extraneous resistance.

Another object of this invention is to provide simplified means for effecting two speed operation in a manner necessitating merely the actuation of a two pole speed selector switch.

More specifically it is an object of this invention to provide a motor of the character described with series and shunt field windings so connected that the actuation of a speed selector switch places them either in series or in parallel, with the motor operating as a shunt motor in the former instance and as a cumulative compound direct current motor in the latter instance.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawing illustrates one complete example of the physical embodiment of the invention constructed in accordance with the best mode so far devised for the practical application of the principles thereof, and in which:

The single figure is a diagrammatic illustration of a motor constructed in accordance with this invention.

Referring now particularly to the accompanying drawing, the numeral 5 designates the series field winding of the motor. This winding may be split to provide two or more poles, illustrated in the drawing as an upper and a lower section. One end of the series field winding is connected with an external terminal 6 on the motor, and its other end is connected with an external terminal 7.

A shunt field winding 8 also divided into upper and lower sections has one end connected with the terminal 7 and its other end connected with a third terminal 9.

The armature 10 has its brushes connected with the terminals 6 and 9.

One side of the line L¹ is permanently connected with the terminal 9, and the other side of the line L² is selectively connectible with either the terminal 6 or the terminal 7 through a speed selector switch 11.

When the speed selector switch is set so that the line L² is connected with the terminal 7, the motor windings are so connected that a standard cumulative compound direct current motor is formed and the motor runs at low speed. Current entering line L² flows simultaneously through the series and shunt field windings, the armature 10 being in series with the series field windings.

When the selector switch is actuated to connect the line L² with the terminal 6, the series and shunt field windings are connected in series so that the motor is a shunt motor rather than a compound motor, and as will be readily apparent to those skilled in the art, the addition of the resistance of the series field winding reduces the current through the shunt field which causes the motor to speed up.

Moreover, when the motor is connected in this manner for high speed operation, the magnetic field of the series field winding bucks the field set up by the shunt field winding. This further reduces the total magnetic field and also acts to increase the speed of the motor.

For high speed operation, the armature is connected directly across the lines, as one of its brushes is permanently connected with the terminal 9 and thus with the line L¹, and its other brush, (for high speed) is connected with the terminal 6 and consequently the line L² through the switch 11.

From the foregoing description taken in connection with the accompanying drawing, it will be readily apparent that this invention entirely obviates the need for extraneous resistance for speed variation, and that an exceptionally simple manner of effecting two speed operation in a direct current motor has been provided.

What I claim as my invention is:

1. A two speed direct current electric motor comprising: a plurality of field windings; means including a speed selector switch for connecting the windings either in parallel or in series with a supply line; an armature; and means for connecting the armature in series with one of the windings when said windings are connected in parallel and directly across the line when the windings are connected in series.

2. In an electric motor: an armature; a shunt field winding; a series field winding; and means for electrically connecting said windings with the armature with the windings either in parallel or in series, and with the armature connected in series with the series field winding when the windings are in parallel, and in parallel with said windings when the same are connected in series so that the motor functions either as a cumulative compound motor having a slow speed or as a shunt motor having a high speed.

3. In an electric motor: a series field winding; a shunt field winding; means electrically connecting one end of the series and shunt field windings; an armature having brushes connected with the opposite ends of the series and shunt field windings; a supply line connected with one side of the armature and said opposite end of the shunt field winding; a second supply line; and means including a switch for selectively connecting the second supply line either with the other side of the armature and said opposite end of the series field winding or with said first named ends of the series field winding and the shunt field winding.

4. In an electric motor: shunt and series field windings connected together at one end; a supply line connected with the opposite end of the shunt field winding; an armature having one side connected with said line and its other side connected with the other end of the series field winding; a second supply line; a two position switch for connecting the second supply line either with the connected ends of the shunt and series field windings so that these windings are in parallel and the armature is connected in series with the series field winding or with said opposite end of the series field winding and the second designated side of the armature so that said series field windings and shunt windings are in series and the armature is connected directly across the line.

5. A two speed direct current motor comprising: a series field winding; a shunt field winding, said two windings being electrically connected at one end; an armature having its brushes connected with the opposite ends of the windings; and means for selectively electrically connecting said field windings with two supply lines with the windings either in series or in parallel.

6. In a two-speed electric motor of the character described: a shunt field winding; a second field winding, said windings having portions thereof adjacent to each other; means electrically connecting one end of the shunt and the second field windings; an armature having brushes connected with the opposite ends of the shunt and second field windings; means for connecting the field windings with supply lines in a manner whereby current flows through the adjacent portions of the windings in the same direction and the windings are in parallel to effect low speed operation; and means for connecting the field windings with supply lines in a manner such that the windings are in series and current flows through said adjacent portions in opposite directions to effect high-speed operation.

7. In an electric motor: a shunt field winding; a second field winding, said windings having portions thereof adjacent to each other; means electrically connecting one end of the shunt and second field windings; an armature connected between the opposite ends of said field windings; means for selectively connecting the field windings with a supply line to have the windings either in parallel or in series with each other, said windings being so connected that when they are in series current traverses their adjacent portions in opposite directions so that the magnetic fields set up thereby buck each other.

8. In an electric motor: three outside terminals; a series field winding having its ends connected with two of said terminals; a shunt field winding having one end connected to one of said two terminals and its other end connected to the third terminal; an armature connected between said third terminal and said terminal having only the series field winding connected therewith; a supply line permanently connected with the third terminal; a second supply line; and switch means for selectively connecting the second supply line with either of said first two terminals.

9. A two speed direct current motor comprising: a series field winding; a terminal connected with one end of the series field winding; a second terminal connected with the opposite end of the series field winding; a shunt field winding having one end connected with said second terminal; a third terminal connected with the opposite end of the shunt field winding; an armature connected between the first and third terminals; a supply line connected with the third terminal; a second supply line; and switch means for selectively connecting the second supply line either with the first designated terminal or the second designated terminal so that said windings can be connected either in series or in parallel to effect respectively either high or low speed operation.

10. In an electric motor: an armature; a shunt field winding; a series field winding; a speed selector switch; and means for connecting the armature and said field windings through the speed selector switch with a supply line, with said field windings in series in one position of the speed selector switch and in parallel in another position of the switch, and with the armature in parallel with the field windings when the field windings are connected in series and in series with the series field winding when the field windings are connected in parallel, whereby the motor functions either as a shunt motor or a cumulative compound motor.

WILBUR R. APPLEMAN.